United States Patent [19]

Oishi et al.

[11] Patent Number: 5,190,712
[45] Date of Patent: Mar. 2, 1993

[54] METHOD FOR MELT-MOLDING WATER-SOLUBLE VINYL ALCOHOL POLYMERS

[75] Inventors: Tsukasa Oishi, Mukou; Toru Seki, Ibaraki; Takuya Honda, Hirakata, all of Japan

[73] Assignee: Nippon Gohsei Kagaku Kogyo Kabushiki Kaisha, Osaka, Japan

[21] Appl. No.: 753,165

[22] Filed: Aug. 30, 1991

Related U.S. Application Data

[63] Continuation-in-part of Ser. No. 635,447, Dec. 28, 1990, abandoned.

[30] Foreign Application Priority Data

Dec. 29, 1989 [JP] Japan ................... 1-340839

[51] Int. Cl.$^5$ ............... B29C 45/72; B29C 47/38; C08F 16/06
[52] U.S. Cl. ............... 264/211.230; 264/328.15; 264/328.16; 264/331.18; 264/331.21; 525/60; 525/62
[58] Field of Search ............ 264/211.23, 328.14, 264/328.15, 328.16, 331.15, 331.18, 331.21; 525/56, 57, 59, 60, 61, 62

[56] References Cited

U.S. PATENT DOCUMENTS

| | | | |
|---|---|---|---|
| 1,971,662 | 8/1934 | Schmidt et al. | 525/56 |
| 2,844,570 | 7/1958 | Broderick | 525/61 |
| 2,990,398 | 6/1961 | Inskip et al. | 525/61 |
| 3,033,841 | 5/1962 | Germain | 525/56 |
| 4,369,281 | 1/1983 | Zimmerman | 525/58 X |
| 4,618,648 | 10/1986 | Marten | 525/60 |
| 4,675,360 | 6/1987 | Marten | 525/60 |
| 4,824,904 | 4/1989 | Aoyama et al. | 525/60 |

FOREIGN PATENT DOCUMENTS

| | | |
|---|---|---|
| 59-155408 | 9/1984 | Japan . |
| 63-99209 | 4/1988 | Japan . |
| 1-158016 | 6/1989 | Japan . |

OTHER PUBLICATIONS

English translation of Japanese Reference (Kokai) 63–99,209 (published Apr. 1988).

*Primary Examiner*—Leo B. Tentoni
*Attorney, Agent, or Firm*—Armstrong, Westerman, Hattori, McLeland & Naughton

[57] ABSTRACT

A method for melt-molding a water-soluble vinyl alcohol polymer which includes melt-molding a water-soluble oxyalkylene group-containing vinyl alcohol copolymer under substantially anhydrous conditions and substantially without use of plasticizer, the copolymer having a vinyl alcohol unit (A), a vinyl ester unit (B) and an oxyalkylene ether unit (C) of the formulas:

$$\mathrm{+CH_2-CH+ \atop OH} \quad (A)$$

$$\mathrm{+CH_2-CH+ \atop OCOR^1} \quad (B)$$

$$\mathrm{+CH_2-CH+ \atop CH_2-O+CHR^2-CHR^3-O\!\!+_{\!\!n}\!R^4} \quad (C)$$

wherein $R^1$ is an alkyl group; $R^2$ and $R^3$ each is a hydrogen atom or an alkyl group; $R^4$ is a hydrogen atom, an alkyl group, a phenyl group or a substituted phenyl group; n is equal to 1 through 50; in proportions of a mol %, b mol % and c mol %, respectively, where $$0.1 \leq c \leq 20,$$

$$50 \leq 100a/(a+b) \leq 100,$$

and the oxyalkylene moiety $(CHR^2-CHR^3-O-)_n$ of unit (C) accounts for 3 to 40 percent by weight of the total resin, and having a melt index of not less than 5 g/10 min. under a load of 2160 at a temperature of 210° C.

5 Claims, No Drawings

METHOD FOR MELT-MOLDING WATER-SOLUBLE VINYL ALCOHOL POLYMERS

This is a continuation-in-part of application Ser. No. 07/635,447, filed on Dec. 28, 1990, now abandoned.

FIELD OF THE INVENTION

The present invention relates to a method for melt-molding a water-soluble vinyl alcohol copolymer containing a vinyl alcohol unit (A), a vinyl ester unit (B) and an oxyalkylene allyl ether unit (C).

BACKGROUND OF THE INVENTION

The shaped article, for example film, of polyvinyl alcohol is not only excellent in fragrance trapping property, transparency, oil resistance, antistatic property, oxygen barrier property and warmth retention property but is also hydrophilic and water-soluble or dispersible and, therefore, can be used in applications where the usual hydrophobic polymer film is not fully useful.

For the production of film from polyvinyl alcohol, it is common practice to dissolve the polymer in water and cast the solution. While the resulting film is flexible under high-humidity conditions, it has a drawback in that its flexibility is lost in the low-humidity environment. To avoid this disadvantage and insure adequate flexibility under low-humidity conditions, it has been practiced to incorporate a plasticizer such as glycerin in the casting solution.

For the production of film and other shaped articles from polyvinyl alcohol, the method comprising melt-extruding the polymer in a hydrous condition is also known. For assurance of adequate flexibility of the extrudate, a plasticizer is employed in this process, too.

Attempts have also been made to melt-extrude polyvinyl alcohol under substantially anhydrous conditions. However, because the softening point of polyvinyl alcohol is high and close to its thermal decomposition point, it is difficult to melt-extrude polyvinyl alcohol as such. Thus, the melt-molding of polyvinyl alcohol by this technique also involves incorporation of a plasticizer in a substantial amount.

Incidentally, polyvinyl alcohol is not injection-molded for all practical purposes.

While polyvinyl alcohol is produced by polymerizing vinyl acetate and, then, hydrolyzing the resulting polymer, a "copolymerization-modified" polyvinyl alcohol can be obtained by using one or more comonomers in the polymerization stage. Moreover, polyvinyl alcohol can be "post-modified" by permitting a certain other compound to react with the OH group. These modified polyvinyl alcohols have, in addition to the inherent properties of polyvinyl alcohol, some new properties derived from the modifying group introduced.

As such modified polyvinyl alcohols, vinyl alcohol copolymers containing oxyalkylene groups are known. Thus, for example, the following domestic and foreign patent applications describe various modified polyvinyl alcohol polymers.

The specifications of U.S. Pat. Nos. 1,971,662, 2,844,570 and 2,990,398 disclose oxyethylene group-containing polyvinyl alcohols which are obtainable by addition reaction of polyvinyl alcohol to ethylene oxide.

The specifications of U.S. Pat. Nos. 3,033,841 and 4,369,281 disclose oxyalkylene group-containing vinyl alcohol polymers produced by graft-polymerization of vinyl acetate in the presence of a polyalkylene glycol and subsequent hydrolysis.

The specifications of U.S. Pat. Nos. 4,618,648 and 4,675,360 disclose vinyl alcohol-poly(alkyleneoxy) acrylates and claim that these copolymers can be injection-or extrusion-molded and that the resulting shaped articles are water-soluble and flexible.

Japanese Patent Application Kokai No. 59-155408 describes a modified polyvinyl alcohol produced by copolymerizing an oxyalkylene group-containing unsaturated monomer with vinyl acetate and saponifying the resulting copolymer. The specification cites an extensive list of possible applications, among which are shaped articles, but is reticent about relevant production technology.

Japanese Patent Application Kokai No. 1-158016 discloses a water-resistant flexible film from an oxyalkylene group-containing vinyl alcohol polymer. Although the specification mentions, "For the production of film, the method of casting an aqueous solution of this polymer, the method of extruding it in hydrous condition under heating and the melt-extrusion method, among others, can be employed", all the examples in the specification are relevant to the casting method alone and no further description is found of the melt-extrusion method, nor is there a description of the method of extruding the polymer in hydrous condition under heating.

The casting method for polyvinyl alcohol has several disadvantages compared with the melt-extrusion method. Thus, the preparation of an aqueous solution is essential, the film-forming speed is low and the drying procedure for the cast film is time-consuming. When a plasticizer is used for insuring flexibility the product film, there occurs the problem of bleeding due to the incorporated plasticizer in addition to the above-mentioned disadvantages.

The method comprising melt-extruding polyvinyl alcohol in hydrous state is also disadvantageous in that a prolonged drying procedure is essential following the extrusion procedure. The use of a plasticizer for imparting flexibility to the extrudate causes the same bleeding problem due to the plasticizer in addition to the same other problems as mentioned above.

The method of melt-extruding much plasticized polyvinyl alcohol tends to cause bleeding-out of the plasticizer to make the surface of the product sticky or cause poor adhesion to other laminating sheets.

In contrast, vinyl alcohol polymers containing oxalkylene units are as flexible as vinyl alcohol polymers per se and, therefore, do not require the addition of a plasticizer.

However, the oxyethylene group-containing polyvinyl alcohols described in U.S. Pat. Nos. 1,971,662, 2,844,570 and 2,990,398 referred to hereinbefore are disadvantageous in that it is difficult to control the length of the side chain oxyethylene group and the technique is unsatisfactory in productivity.

The oxyalkylene group-containing polyvinyl alcohols described in the specifications of U.S. Pat. Nos. 3,033,841 and 4,369,281 are not practically useful, for the graft-polymerization of alkylene glycol is low in reactivity.

The vinyl alcohol-poly(alkyleneoxy) acrylate copolymers described in U.S. Pat. Nos. 4,618,648 and 4,675,360, which are produced by copolymerizing vinyl acetate with poly(alkyleneoxy) acrylate and, then, hydrolyzing the copolymer, are disadvantageous in that the oxyalkylene group tends to leave off during the hydrolysis reaction so that the hydrolyzate is actually a mixture of the desired polymer and the liberated alkylene glycol or polyalkylene glycol.

Japanese Patent Application Kokai No. 59-155408 contains a description of the production process for an oxyalkylene group-containing vinyl alcohol polymer and of contemplated uses for the polymer but contains no specific disclosure of molding techniques, not to speak of melt-molding.

Japanese Patent Application Kokai No. 1-158016 suggests the melt-molding of an oxyalkylene group-containing vinyl alcohol polymer but when the proposed method is reduced to practice, smooth molding is hardly attained.

U.S. Pat. No. 4,824,904 and Japanese Patent Application Kokai No. 63-99209 disclose a saponified ethylenevinyl acetate copolymer including an oxyalkylene unit. However, the copolymer is insoluble in water.

Under the circumstances the present invention has been accomplished to provide a commercially useful method for melt-molding an oxyalkylene group-containing vinyl alcohol copolymer under substantially anhydrous conditions.

SUMMARY OF THE INVENTION

The method for melt-molding a water-soluble vinyl alcohol copolymer according to the present invention comprises melt-molding a water soluble, oxyalkylene group-containing vinyl alcohol copolymer under substantially anhydrous conditions, and substantially without use of plasticizer, wherein said copolymer comprises a vinyl alcohol unit (A), a vinyl ester unit (B) and an oxyalkylene allyl ether unit (C) of the formulas:

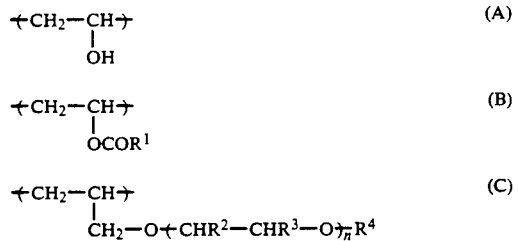

wherein $R^1$ in (B) is an alkyl group; $R^2$ and $R^3$ in (C) each is a hydrogen atom or an alkyl group; $R^4$ in (C) is a hydrogen atom, an alkyl group, a phenyl group or a substituted phenyl group; n is equal to 1 through 50; in proportions of a mol %, b mol % and c mol %, respectively, where $$0.1 \leq c \leq 20$$

$$50 \leq 100a/(a+b) \leq 100$$

and the oxyalkylene moiety $(CHR^2-CHR^3-O)_n$ of unit (C) accounts for 3 to 40 percent by weight of the total resin, and has a melt index of not less than 5 g/10 min. under a load of 2160 g at a temperature of 210° C.

DETAILED DESCRIPTION OF THE INVENTION

The oxyalkylene group-containing vinyl alcohol copolymer to be employed in the present invention comprises a vinyl alcohol unit (A), a vinyl ester unit (B) and an oxyalkylene allyl ether unit (C) in the proportions of a mol %, b mol % and c mol %, respectively.

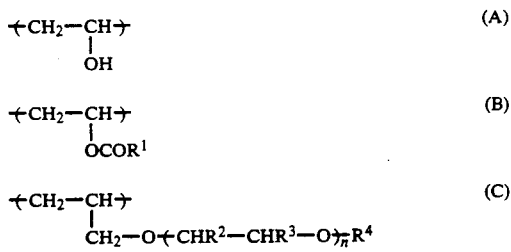

In formula (B), $R^1$ is an allyl group, preferably methyl. In formula (C), $R^2$ and $R^3$ each is a hydrogen atom or an alkyl group, both being hydrogen atoms or one being a hydrogen atom with the other being methyl; $R^4$ is a hydrogen atom, an alkyl group, a phenyl group or a substituted phenyl group; and n is equal to 1 through 50, preferably 3 through 50. A typical example of said vinyl ester unit (B) is a vinyl acetate. Examples of oxyalkylene allyl ether unit (C) are polyoxyethylene allyl ether, polyoxyethylene methallyl ether, polyoxypropylene allyl ether and polyoxypropylene methallyl ether.

The above copolymer must satisfy the following conditions:

$$0.1 \leq c \leq 20,$$

$$50 \leq 100a/(a+b) \leq 100$$

The first condition requires that the proportion of oxyalkylene allyl ether (C) in the copolymer must be within the range of 0.1 to 20 mol %. The improving effect of the invention will not be sufficient if the proportion of (C) is less than 0.1 mol %, whereas the use of (C) in excess of 20 mol % impairs the inherent properties of polyvinyl alcohol. The preferred range is 0.1 to 10 mol % and the particularly preferred range is 0.1 to 5 mol %.

The second condition requires that the degree of saponification of the vinyl ester component (B) before hydrolysis must be within the range of 50 to 100 mol %. when the degree of saponification is less than 50 mol %, the hydrophilicity, fragrance trapping property, oil resistance, antistaticity, oxygen barrier property and warmth retention property of polyvinyl alcohol are not fully obtained. The particularly preferred range is 80 to 100 mol %.

If desired, various optional monomers other than (A), (B) and (C) may be present in a proportion which does not spoil the water-soluble property of the copolymer, for example, in a proportion not exceeding about 10 mol %. Such other monomers include, among others, ethylenically unsaturated carboxylic monomers such as acrylic acid, methacrylic acid, crotonic acid, maleic acid, fumaric acid or itaconic acid, and their half and full alkyl esters, anhydrides, amides, imides and salts, ethylenically unsaturated sulfonic monomers such as ethylenesulfonic acid, allylsulfonic acid or methallylsulfonic acid, and their salts, cationic monomers such as N-acrylamide methyl trimethyl ammonium chloride, allyl trimethyl ammonium chloride, dimethyl diallyl ammonium chloride, diethyl diallyl ammonium chloride, alkyl vinyl ether and so on.

The preferred unit (B) is vinyl acetate. In this case, the effect of the invention is particularly remarkable when the oxyalkylene moiety of unit (C) accounts for 3 to 40 weight % of the total resin.

Oxyalkylene moiety:

Thus, it is important to insure not only that the proportion of (C) in the copolymer is within the range of 0.1 to 20 mol %, preferably 0.1 to 10 mol %, and more preferably 0.1 to 5 mol %, but also that the oxyalkylene moiety accounts for 3 to 40 weight %, preferably 5 to 30 weight %, of the total resin. In other words, for smooth melt-molding under anhydrous conditions, there are limits to the degree of localization of the oxyalkylene moiety within the copolymer and the length of the oxyalkylene moiety. The range of n is preferably 3 to 50 and that of the degree of saponification is preferably 80 to 100 mol %.

The oxyalkylene group-containing vinyl alcohol copolymer to be used in the present invention must have a melt index of not less than 5 g/10 min. under a load of 2160 g at 210° C. When this value is less than 5 g/10 min, melt-molding may not be performed as smoothly as desired even if other conditions were fulfilled. In this specification, the melt index is the value measured with a Toyo Seiki melt indexer with a 1 mm dia.×10 mm nozzle.

Thus, the melt-molding under substantially anhydrous conditions is feasible with success on a commercial scale only when the oxyalkylene group-containing vinyl alcohol copolymer meeting the above requirements is employed.

The above oxyalkylene group-containing vinyl alcohol copolymer can be produced by polymerizing monomers for constituting said vinyl ester unit (B) and oxyalkylene allyl ether unit (C), if necessary together with other copolymerizable monomers, and then hydrolyzing the resulting polymer. By this hydrolysis procedure, most or all of vinyl ester unit (B) is converted to vinyl alcohol.

The polymerization process that can be employed is generally solution polymerization but depending on cases, suspension polymerization and emulsion polymerization techniques may also be employed.

The hydrolysis can be carried out with alkali or acid.

The melt-molding of said oxyalkylene group-containing vinyl alcohol copolymer is conducted under substantially anhydrous conditions. The term 'substantially anhydrous' means that although residual water is permissible up to a limit of about 5 weight %, the water content is preferably not more than 1 weight % and more desirably not more than 0.5 weight %.

Prior to melt-molding, a plasticizer such as a polyhydric alcohol may be incorporated but since sufficient flexibility can be obtained without a plasticizer and the use of a plasticizer may rather affect the properties of the product adversely, it is rather recommended not to use a plasticizer.

Prior to melt-molding, various additives such as a filler, colorant, stabilizer and so on can be incorporated. Within the range not jeopardizing the objects of the invention, other polymers may be added or, conversely, the above oxyalkylene group-containing vinyl alcohol copolymer may be added to other polymers.

The melt-molding process may be any of injection molding, extrusion molding, transfer molding and other techniques.

The most important melt-molding process is injection molding. The present invention is quite a departure from the prior art in that a water-soluble vinyl alcohol copolymer can be injection-molded under anhydrous or substantially anhydrous conditions. Incidentally, U.S. Pat. No. 4,618,648 and U.S. Pat. No. 4,675,360 describe the injection molding and extrusion molding of a copolymer of vinyl alcohol with a poly(alkyleneoxy)acrylate but since the alkylene glycol or polyalkylene glycol acts as a plasticizer, the process is actually plasticized injection molding.

The preferred injection molding conditions are: cylinder temperature 150°~250° C., mold temperature 30°~100° C. and injection pressure 500~2000 kg$^2$. It should be understood that even though the oxyalkylene group-containing vinyl alcohol copolymer is injection-moldable, its molding is difficult compared with other general-purpose resins and that, therefore, the molding conditions must be critically controlled.

Among the above-mentioned molding techniques that can be employed, extrusion molding is also important.

The extrusion molding includes various techniques such as blow molding, inflation molding, co-extrusion molding, extrusion coating, etc. and all of them are relevant to the present invention.

In extrusion molding, the die temperature is preferably set at 150°~300° C. and the temperature of the screw compression zone at a temperature higher by 5°~30° C. than the temperature of the discharge zone. In extrusion molding, too, strict setting and control of molding temperature are required.

The present invention offers the following advantages. When the copolymer produced by copolymerizing monomers for constituting vinyl ester unit (B) and oxyalkylene allyl ether unit (C) is hydrolyzed, the oxyalkylene moiety of oxyalkylene allyl ether unit (C) is not liberated.

In the oxyalkylene group-containing vinyl alcohol copolymer to be used in the invention, vinyl alcohol unit (A) and oxyalkylene allyl ether unit (C) are distributed in an appropriate ratio and the weight proportion of oxyalkylene moiety in unit (C) is controlled within the defined range. Therefore, the degree of localization of the oxyalkylene moiety and the length of the oxyalkylene moiety are well balanced and suited for melt-molding. Furthermore, the melt index of the whole copolymer is defined so as to be suitable for melt-molding.

Therefore, by selecting molding conditions within the defined range, melt-molding, e.g. injection molding, can be carried out under substantially anhydrous conditions, and even without addition of a plasticizer, advantageously on a commercial scale.

The resulting shaped article is not only water-soluble and flexible but has fragrance trapping property, oil resistance, antistaticity, oxygen barrier property and warmth retention property, all of which are derived from vinyl alcohol unit (A).

The shaped article may be rendered water-resistant by incorporating a crosslinking agent in the melt-molding stage or subjecting the product to heat treatment or treatment with a crosslinking agent.

The following examples are further illustrative of the invention.

Production of the Copolymer

EXAMPLE 1

A polyoxyethylene (average: 25 mols) monoallyl ether and vinyl acetate were copolymerized in methanol in the presence of azobisisobutyronitrile and after stripping of the residual monomers, the reaction product was hydrolyzed by addition of a methanolic solution of sodium hydroxide. The hydrolyzed slurry was filtered to separate the copolymer, which was then washed and dried to give the desired oxyalkylene group-containing vinyl alcohol copolymer.

The proportion a of vinyl alcohol unit (A) in this copolymer was 93 mol %. The proportion b of vinyl acetate unit (B) was 6 mol and the proportion c of oxyethylene allyl ether unit was 1 mol %.

Thus, $$a+b+c=100 \text{ mol \%}$$

$$c=1 \text{ mol \%}$$

$$100a/(a+b)=94$$

Based on the total weight of (A), (B) and (C), the proportion of the oxyethylene moiety was 19 weight %.

The melt index of this copolymer under a load of 2160 g at 210° C. was 15 g/10 min.

The viscosity of a 4 wt. % solution of the copolymer was 3.6 cps/20° C.

The characteristic values of the above copolymer are shown in Table 1.

EXAMPLES 2~6

Substantially in the same manner as Example 1, copolymers having various characteristic values shown in Table 1 were produced.

COMPARATIVE EXAMPLES 1~4

Substantially in the same manner as Example 1, copolymers having various characteristic values shown in Table 2 were produced. These copolymers did not have the characteristics defined in the present invention.

TABLE 1

|  | Example | | | | | |
|---|---|---|---|---|---|---|
|  | 1 | 2 | 3 | 4 | 5 | 6 |
| Unit (A) a mol % | 93 | 97.4 | 97.8 | 93.2 | 66 | 92 |
| Unit (B) b mol % | 6 | 1.0 | 1.0 | 2.8 | 22 | 4.9 |
| Unit (C) c mol % | 1 | 1.6 | 1.2 | 4 | 12 | 1.1 |
| Unit (D) d mol % | 0 | 0 | 0 | 0 | 0 | 2 |
| n in unit (C) | 25 | 25 | 15 | 10 | 2 | 15 |
| a + b + c mol % | 100 | 100 | 100 | 100 | 100 | 98 |
| 100a/(a + b) mol % | 94 | 99 | 99 | 97 | 75 | 95 |
| Wt. % of oxyalkylene moiety | 19 | 30 | 15 | 34 | 16 | 23.9 |
| Melt index (g/10 min.) | 15 | 18 | 21 | 9 | 37 | 13 |
| Viscosity of 4 wt. % solution in water (cps/20° C.) | 3.6 | 2.9 | 4.3 | 3.8 | 3.5 | 3.9 |

Note 1 In all examples, unit (B) is vinyl acetate.
Note 2 Unit (C) is polyoxyethylene allyl ether in Examples 1-5 and polyoxypropylene allyl ether in Example 6. The terminus is H except that it is CH₃ in Example 5.
Note 3 Unit (D) is monomethyl maleate.
Note 4 Wt. % of oxyalkylene moiety is based on the total weight of (A) + (B) + (C).

TABLE 2

|  | Comparative Example 1 | Comparative Example 2 | Comparative Example 3 | Comparative Example 4 |
|---|---|---|---|---|
| Unit (A) a mol % | 30 | 97.4 | 97.8 | 72 |
| Unit (B) b mol % | 69 | 1.0 | 1.0 | 3 |
| Unit (C) c mol % | 1.0 | 1.6 | 1.2 | 25 |
| Unit (D) d mol % | 0 | 0 | 0 | 0 |
| n in unit (C) | 25 | 25 | 15 | 10 |
| a + b + c mol % | 100 | 100 | 100 | 100 |
| 100a/(a + b) mol % | 30 | 99 | 99 | 96 |
| Wt. % of oxyalkylene moiety | 13 | 30 | 15 | 77 |
| Melt index (g/10 min.) | 20 | 2 | ≦1 | ≦50 |
| Viscosity of 4 wt. % solution in water (cps/20° C.) | Insoluble in water | 10 | 15 | Not measurable |

Note 1 Unit (B) is vinyl acetate in all Comparative Examples.
Note 2 Unit (C) is polyoxyethylene allyl ether in Comparative Examples 1-3 and polyoxypropylene allyl ether in Comparative Example 4. The terminus is H in all cases.

Molding Materials

Each of the oxyalkylene group-containing vinyl alcohol copolymers according to Examples 1~6 and Comparative Examples 1~4 was dried to a water content of not more than 0.1 weight % and fed to an extrusion machine. The molding was cut into pellets, which were then melt-molded under the following conditions.

Injection Molding Conditions

| Injection molding machine Screw-type automatic injection molder Model N100 (The Japan Steel Works, Ltd.) | |
|---|---|
| Conditions | |
| Injection molding | |
| Screw mixing temperature | 200° C. |
| Discharge temperature | 210° C. |
| Mold temperature | 50° C. |
| Injection pressure | 700 kg/cm² |
| Molding cycle | 20 sec. |
| Extrusion molding | |
| Extruding machine | A twin-screw extruder |
| Screw | L 1150 mm, D 40 mm L/D = 28.75 |
| Rotational speed | 50 rpm |
| Cylinder temperature | 200° C. (compression zone) |
| T-die temperature | 190° C. |

Results

The results of the injection and extrusion trials and the properties of the resulting products are shown in Tables 3 and 4.

The parameters of moldability, water-solubility, flexibility, blocking and bleeding were respectively evaluated as follows.

Moldability (for both injection molding and extrusion molding): The surface roughness of the product was evaluated. The absence of roughness was express as ◯.

Water-solubility: Each testpiece (10 mm×50 mm×1 mm) was immersed in 100 g of water at 5° C. without stirring for 10 minutes for observation of solubility. The result of observation was evaluated on the following 3-grade scale.

◯: Undissolved residue=30 wt. %
Δ: Undissolved residue≧30 wt. %~<70 wt. %
x: Undissolved residue≧70 wt. %

Flexibility (JIS K 7203): Each testpiece was conditioned at 20° C. and 60% R.H. for 30 days for assessment of flexibility. When the testpiece was flexible, the result was rated ◯. Flexural modulus was also measured.

Blocking: Two testpieces (10 mm×50 mm×1 mm each) were placed one on the other and allowed to remain under a load of 5 g/cm² at 20° C. and 72% R.H. for 16 hours. The testpieces were then examined and evaluated as follows. No adhesion=◯, slight adhesion=Δ and adhesion=x.

Bleeding: The product was placed alternately in an environment of 20° C., 65% R.H. for 16 hr. and an environment of 40° C., 80% R.H. for 8 hr. each in 30 cycles and, then, evaluated as follows. No bleeding=◯.

TABLE 3

|  | Example | | | | | |
|---|---|---|---|---|---|---|
|  | 1 | 2 | 3 | 4 | 5 | 6 |
| Injection-molded | | | | | | |
| Moldability (surface roughness) | ◯ | ◯ | ◯ | Slightly rough | ◯ | ◯ |
| Solubility | ◯ | ◯ | ◯ | ◯ | Δ | ◯ |
| Clouding | None | None | None | None | Slight | None |
| Flexibility | ◯ | ◯ | ◯ | ◯ | ◯ | ◯ |
| Flexural modulus | 29 | 20 | 35 | 25 | 25 | 30 |
| Blocking | ◯ | ◯ | ◯ | ◯ | Δ | ◯ |
| Bleeding | ◯ | ◯ | ◯ | ◯ | ◯ | ◯ |
| Extrusion-molded | | | | | | |
| Moldability (surface roughness) | ◯ | ◯ | ◯ | ◯ | ◯ | ◯ |
| Solubility | ◯ | ◯ | ◯ | ◯ | Δ | ◯ |
| Clouding | None | None | None | None | Slight | None |
| Flexibility | ◯ | ◯ | ◯ | ◯ | ◯ | ◯ |
| Flexural modulus | 29 | 20 | 35 | 25 | 25 | 30 |
| Blocking | ◯ | ◯ | ◯ | ◯ | Δ | ◯ |
| Bleeding | ◯ | ◯ | ◯ | ◯ | ◯ | ◯ |

Note 1 The unit of flexural modulus is kg/mm².

TABLE 4

|  | Comparative Example 1 | Comparative Example 2 | Comparative Example 3 | Comparative Example 4 |
|---|---|---|---|---|
| Injection-molded | | | | |
| Moldability (surface roughness) | Rough surface, mold stain | Rough surface, marked WL | Rough surface, marked WL | — |
| Solubility | x | — | — | — |
| Clouding | ◯ | — | — | — |
| Flexibility | ◯ | — | — | — |
| Flexural modulus | | — | — | — |
| Blocking | x | — | — | — |
| Bleeding | ◯ | — | — | — |
| Extrusion-molded | | | | |
| Moldability (surface roughness) | Slightly rough | Slightly rough | — | — |
| Solubility | x | Δ | — | — |
| Clouding | | | — | — |
| Flexibility | ◯ | ◯ | — | — |
| Flexural modulus | 25 | 30 | — | — |
| Blocking | x | ◯ | — | — |
| Bleeding | ◯ | ◯ | — | — |

Note 1 "WL" stands for weldline.
Note 2 The unit of flexural modulus is kg/mm².
Note 3 "—" Not measured because the product was too inferior to be evaluated.

The above results, also indicate that the copolymers of Examples of the invention are commercially useful for injection molding and extrusion molding applications and the products are excellent in water solubility and flexibility and free from blocking and bleeding.

Melt-moldability of polyvinyl alcohol

For control purposes, the melt-molding of polyvinyl alcohol was also carried out.

The following polyvinyl alcohols were used.

In the following table, (1) represents the degree of polymerization, (2) the degree of saponifications (mol %), (3) the viscosity of a 4 wt. % aqueous solution (cps/20° C.), (4) the melt index under a load of 2160 g at 210° C/. and (5) the amount (wt. parts) of the plasticizer glycerin per 100 wt. parts of polyvinyl alcohol.

|  | (1) | (2) | (3) | (4) | (5) |
|---|---|---|---|---|---|
| PVA-1 | 200 | 93 | 3.2 | 24 | 0 |
| PVA-2 | 300 | 88 | 3.3 | 28 | 0 |
| PVA-3 | 300 | 80 | 3.4 | 34 | 0 |
| PVA-4 | 200 | 93 | 3.2 | 29 | 7 |

The results of extrusion-molding of PVA-1, PVA-2, PVA-3 and PVA-4 under the same conditions as Example 1 are shown below.

|  | Water solubility | Flexibility | Blocking | Bleeding |
|---|---|---|---|---|
| PVA-1 | ◯ Good | x None | ◯ None | ◯ None |
| PVA-2 | ◯ Good | x None | Δ Slight blocking | ◯ None |
| PVA-3 | Δ Punctate fogging | x None | x Blocking | ◯ None |
| PVA-4 | x Clouding | ◯ Yes | ◯ None | x Bleeding |

COMPARATIVE EXAMPLES 5-9

Comparative Examples 5 through 8 correspond to Examples 1 through 4 of Japanese Un-examined Publication KOKAI No. 63-99209, respectively. Comparative Example 9 corresponds to Example 1-7 of U.S. Pat. No. 4,824,904.

COMPARATIVE EXAMPLE 5

13.7 kg vinyl acetate, 0.70 kg polyoxypropyleneallyl ether containing polymerizable double bond at one end and having a molecular weight of 1500, 1.0 kg methanol and 11 g of 2,2'-azobisisobutyronitrile as initiator were charged in a polymerization cell. Ethylene was supplied to the cell up to 41 kg/cm².

The monomers were copolymerized at 60° C. for 6 hours. The conversion of the vinyl acetate was 39%. The copolymerization liquid was supplied to a column. Un-reacted vinyl acetate was expelled by introducing methanol into the column.

The copolymer liquid was saponified in the presence of sodium hydroxide. The graft copolymer obtained was washed with methanol and then water, soaked in dilute acetic acid aqueous solution and dried at 60°–105° C.

The graft copolymer thus obtained has an ethylene content of 32.5 mole %, polyoxypropylene content of 7.2 weight % and the degree of hydrolysis of vinyl acetate units of 99.4 mole %. The melt index of the graft copolymer under a load of 2160 g at 190° C. was 1.3 g/10 min.

The viscosity of a 4 weight % aqueous solution of the graft copolymer cannot be determined since the graft copolymer is entirely insoluble in water.

COMPARATIVE EXAMPLE 6

13.7 kg vinyl acetate, 1.4 kg polyoxypropyleneallyl ether containing polymerizable double bond at one end and having a molecular weight of 1500, 0.5 kg methanol and 20 g of 2,2'-azobisisobutyronitrile as initiator were charged in a polymerization cell. Ethylene was supplied to the cell up to 50 kg/cm$^2$.

The monomers were copolymerized at 60° C. for 6 hours. The conversion of the vinyl acetate was 35%. The copolymerization liquid was supplied to a column. Un-reacted vinyl acetate was expelled by introducing methanol into the column.

The copolymer liquid was saponified in the presence of sodium hydroxide. The graft copolymer obtained was washed with methanol and then water, soaked in dilute acetic acid aqueous solution and dried at 60°–105° C.

The graft copolymer thus obtained has an ethylene content of 37.9 mole %, polyoxypropylene content of 12.0 weight % and a degree of hydrolysis of vinyl acetate units of 99.6 mole %. The melt index of the graft copolymer under a load of 2160 g at 190° C. was 2.1 g/10 min.

The viscosity of a 4 weight % aqueous solution of the graft copolymer cannot be determined since the graft copolymer is entirely insoluble in water.

COMPARATIVE EXAMPLE 7

13.7 kg vinyl acetate, 1.2 kg polyoxytetramethylene containing polymerizable double bond at one end and having a molecular weight of 2300, 0.5 kg methanol and 31 g of 2,2'-azobisisobutyronitrile as initiator were charged in a polymerization cell. Ethylene was supplied to the cell up to 60 kg/cm$^2$.

The monomers were copolymerized at 60° C. for 6 hours. The conversion of the vinyl acetate was 33%. The copolymerization liquid was supplied to a column. Un-reacted vinyl acetate was expelled by introducing methanol into the column.

The copolymer liquid was saponified in the presence of sodium hydroxide. The graft copolymer obtained was washed with methanol and then water, soaked in dilute acetic acid aqueous solution and dried at 60°–105° C.

The graft copolymer thus obtained has an ethylene content of 45.0 mole %, polyoxytetramethylene content of 9.8 weight and the degree of hydrolysis of vinyl acetate units of 99.3 mole %. The melt index of the graft copolymer under a load of 2160 g at 190° C. was 5.5 g/10 min.

The viscosity of a 4 weight % aqueous solution of the graft copolymer cannot be determined since the graft copolymer is entirely insoluble in water.

COMPARATIVE EXAMPLE 8

17.4 kg of vinyl acetate, 8.7 kg polyoxypropyleneallyl ether containing polymerizable double bond at one end and having a molecular weight of 1500, 2.9 kg polyoxypropyleneallyl ether containing polymerizable double bond at both ends and having a molecular weight of 3000 and 84 g of 2,2'-azobis-and (2,4-dimethylvaleronitrile) as initiator were charged in a polymerization cell. Ethylene was supplied to the cell up to 32 kg/cm$^2$.

The monomers were copolymerized at 60° C. for 6 hours. The conversion of the vinyl acetate was 30%. The copolymerization liquid was supplied to a column. Un-reacted vinyl acetate was expelled by introducing methanol into the column.

The copolymer liquid was saponified in the presence of sodium hydroxide. The graft copolymer obtained was washed with methanol and then water, soaked in dilute acetic acid aqueous solution and dried at 60°–105° C.

The graft copolymer thus obtained has an ethylene content of 33.5 mole %, polyoxypropylene content of 39 weight % and a degree of hydrolysis of vinyl acetate units of 99.2 mole %. The melt index of the graft copolymer under a load of 2160 g at 190° C. was 1.8 g/10 min.

The viscosity of a 4 weight % aqueous solution of the graft copolymer cannot be determined since the graft copolymer is insoluble in water.

COMPARATIVE EXAMPLE 9

In a polymerization tank was charged a solution of 11.0 kg of vinyl acetate, 7.46 kg of polyoxypropylene allyl ether having a molecular weight of 3000 and containing polymerizable double bonds at both ends thereof, 4.7 kg of methanol and 45 g of 2,2'-azobis-(2,4-dimethylvaleronitrile) dissolved in 500 ml of methanol and the ethylene pressure was rendered 37 kg/cm$^2$.

Copolymerization was conducted at 60° C. for 6.8 hours. The conversion of the vinyl acetate was 40%. Then, the copolymerization reaction solution was supplied to a stripping tower. After the unreacted vinyl acetate was removed from the top by feeding methanol from the bottom of the tower, saponification was performed using sodium hydroxide as a catalyst in a conventional manner. Then after thoroughly washing with acetone and then with water, the product was immersed in a dilute aqueous acetic acid solution and the system was dried at 60 to 105° C. in a nitrogen flow.

The copolymer thus obtained has an ethylene content of 37.6 mole %, polyoxypropylene content of 49 weight % and a saponification degree of hydrolysis of the vinyl acetate component of 99.4 mole %. The melt index of the copolymer under a load of 2160 g at 190° C. was 0.51g/10 min.

The viscosity of a 4 weight % aqueous solution of the graft copolymer cannot be determined since the graft copolymer is entirely insoluble in water.

From the results of these Comparative Examples, it is understood that the saponified ethylene-vinyl acetate copolymer containing polyether component disclosed in U.S. Pat. No. 4,824,904 or Japanese Un-examined Publication KOKAI No. 63-99209 is insoluble in water.

What is claimed is:

1. A method for melt-molding a water-soluble vinyl alcohol copolymer which comprises melt-molding a water-soluble, oxyalkylene group-containing vinyl alcohol copolymer under substantially anhydrous conditions, and substantially in the absence of plasticizers, said copolymer comprising a vinyl alcohol unit (A), a vinyl ester unit (B) and an oxyalkylene allyl ether unit (C) of the formulas:

$$\mathrm{-(CH_2-CH)-} \atop \mathrm{OH} \qquad (A)$$

$$\mathrm{-(CH_2-CH)-} \atop \mathrm{OCOR^1} \qquad (B)$$

$$\mathrm{-(CH_2-CH)-} \atop \mathrm{CH_2-O-(CHR^2-CHR^3-O)_{\overline{n}} R^4} \qquad (C)$$

wherein $R^1$ in (B) is an alkyl group; $R^2$ and $R^3$ in (C) each is a hydrogen atom or an alkyl group; $R^4$ in (C) is a hydrogen atom, an alkyl group, a phenyl group or a substituted phenyl group; n is equal to 1 through 50; in proportions of a mol %, b mol % and c mol %, respectively, where $$0.1 \leq c \leq 20,$$

$$50 \leq 100a/(a+b) \leq 100,$$

and the oxyalkylene moiety $(CHR^2-CHR^3-O-)_n$ of unit (C) accounts for 3 to 40 percent by weight of the total resin, and having a melt index of not less than 5 grams/10 minutes under a load of 2,160 g at a temperature of 210° C.

2. A method for melt-molding as claimed in claim 1 wherein unit (B) is a vinyl acetate.

3. A method for melt-molding as claimed in claim 1 wherein the copolymer satisfies the following conditions:

$$3 \leq n \leq 50,$$

$$0.1 \leq c \leq 5,$$

$$80 \leq 100a/(a+b) \leq 100$$

the oxyalkylene moiety $(CHR^2-CHR^3-O)_n$ of unit (C) accounts for 5 to 30 percent by weight of the total resin.

4. A method for melt-molding as claimed in claim 1 wherein said melt-molding is performed by injection molding at a cylinder temperature of 150 to 250° C., a mold temperature of 30 to 100° C. and an injection pressure of 500 to 2,000 kg/cm².

5. A method for melt-molding as claimed in claim 1 wherein the melt-molding is performed by extrusion molding at a die temperature of 150 to 300° C. and a screw compression zone temperature higher by 5 to 30° C. than a discharge zone temperature.

* * * * *